US012800436B2

(12) United States Patent
Matsumura et al.

(10) Patent No.: US 12,800,436 B2
(45) Date of Patent: Nov. 17, 2026

(54) STATE MONITORING DEVICE AND STATE MONITORING METHOD FOR BALL SCREW

(71) Applicant: NSK LTD., Tokyo (JP)

(72) Inventors: Keisuke Matsumura, Fujisawa (JP); Satoshi Hashimoto, Fujisawa (JP); Yuki Yamada, Fujisawa (JP)

(73) Assignee: NSK LTD., Tokyo (JP)

( * ) Notice: Subject to any disclaimer, the term of this patent is extended or adjusted under 35 U.S.C. 154(b) by 343 days.

(21) Appl. No.: 18/285,688

(22) PCT Filed: Apr. 13, 2021

(86) PCT No.: PCT/JP2021/015296

§ 371 (c)(1),
(2) Date: Oct. 5, 2023

(87) PCT Pub. No.: WO2022/219712

PCT Pub. Date: Oct. 20, 2022

(65) Prior Publication Data

US 2024/0183750 A1 Jun. 6, 2024

(51) Int. Cl.
*G01M 13/028* (2019.01)
*F16H 25/22* (2006.01)
(Continued)

(52) U.S. Cl.
CPC .......... *G01M 13/028* (2013.01); *G01M 13/00* (2013.01); *F16H 25/2204* (2013.01);
(Continued)

(58) Field of Classification Search
CPC . G01M 13/028; G01M 13/00; F16H 25/2204; F16H 25/2214; F16H 57/01; F16H 2057/012; F16H 2057/018
(Continued)

(56) References Cited

U.S. PATENT DOCUMENTS 4,061,311 A * 12/1977 Yamasaki ................ B66D 3/18 254/331
5,495,764 A * 3/1996 Matsuzaki .......... G01M 13/045 73/593
(Continued)

FOREIGN PATENT DOCUMENTS

CN 102261446 A * 11/2011 ............. F16H 57/01
DE 102010017113 A1 * 12/2011 ............ G01M 13/04
(Continued)

OTHER PUBLICATIONS

Translation JP_2013164386 (Year: 2013).*
(Continued)

*Primary Examiner* — Peter J Macchiarolo
*Assistant Examiner* — Monica S Young
(74) *Attorney, Agent, or Firm* — Sughrue Mion, PLLC

(57) ABSTRACT

Disclosed are a state monitoring device and a state monitoring method for a ball screw, which enable appropriate collection of data to accurately diagnose the state of the ball screw. The state monitoring device monitors the state of the ball screw having a screw shaft, a nut, and a plurality of balls. The state monitoring device includes a drive control unit for controlling a drive unit (servo motor) to cause the screw shaft and the nut to move relative to each other at a constant speed for one or more reciprocating motions under an unloaded condition, and a data collection unit for collecting, as data, physical quantities related to the ball screw while the drive unit is controlled by the drive control unit.

10 Claims, 7 Drawing Sheets

(51) Int. Cl.
*F16H 57/01* (2012.01)
*G01M 13/00* (2019.01)

(52) U.S. Cl.
CPC .......... *F16H 25/2214* (2013.01); *F16H 57/01* (2013.01); *F16H 2057/012* (2013.01); *F16H 2057/018* (2013.01)

(58) Field of Classification Search
USPC ............................................................ 73/593
See application file for complete search history.

(56) References Cited

U.S. PATENT DOCUMENTS

| | | | | |
|---|---|---|---|---|
| 2001/0029797 | A1* | 10/2001 | Lange | F16H 25/2015 74/89.37 |
| 2003/0030565 | A1* | 2/2003 | Sakatani | G01M 13/045 340/682 |
| 2003/0090018 | A1* | 5/2003 | Bulgrin | B29C 45/76 425/150 |
| 2008/0010039 | A1* | 1/2008 | Miyasaka | G01H 3/08 702/183 |
| 2008/0234964 | A1* | 9/2008 | Miyasaka | G01M 13/04 702/113 |
| 2017/0307066 | A1 | 10/2017 | Chu et al. | |
| 2019/0063568 | A1 | 2/2019 | Laskovy et al. | |
| 2019/0243351 | A1* | 8/2019 | Okita | G05B 23/0275 |
| 2019/0293157 | A1 | 9/2019 | Gouko et al. | |
| 2019/0301974 | A1* | 10/2019 | Mansour | F16C 29/0633 |
| 2020/0056961 | A1 | 2/2020 | Honjo et al. | |
| 2020/0133257 | A1* | 4/2020 | Cella | G06N 3/0464 |

FOREIGN PATENT DOCUMENTS

| | | | | | |
|---|---|---|---|---|---|
| EP | 3 413 027 | A1 | | 12/2018 | |
| EP | 3505907 | A1 | * | 7/2019 | F16H 21/20 |
| EP | 3546778 | A1 | * | 10/2019 | G01M 13/00 |
| EP | 3 734 117 | A1 | | 11/2020 | |
| JP | 2012098213 | A | * | 5/2012 | |
| JP | 2013164386 | A | * | 8/2013 | |
| JP | 2016109483 | A | * | 6/2016 | |
| JP | 6403743 | B2 | | 10/2018 | |
| JP | 2018205213 | A | * | 12/2018 | G01M 13/045 |
| JP | 2019148311 | A | * | 9/2019 | |
| JP | 2020040137 | A | * | 3/2020 | |
| JP | 6742563 | B1 | * | 8/2020 | G01M 15/12 |
| JP | 6981586 | B1 | * | 12/2021 | G01M 13/028 |
| WO | WO-2017048788 | A1 | * | 3/2017 | H02K 11/35 |
| WO | WO-2022153013 | A1 | * | 7/2022 | G01R 31/2829 |

OTHER PUBLICATIONS

Translation_JP2012098213 (Year: 2012).*
Translation_JP2016109483 (Year: 2016).*
Translation_JP2018205213 (Year: 2018).*
Translation_JP2019148311 (Year: 2019).*
Translation_JP2020040137 (Year: 2020).*
International Search Report for PCT/JP2021/015296 dated Jun. 22, 2021.
Extended European Search Report issued May 10, 2024 in European Application No. 21936914.7.
Communication dated Apr. 1, 2026, issued in Chinese Application No. 202180097080.5.

* cited by examiner

STATE MONITORING DEVICE AND STATE MONITORING METHOD FOR BALL SCREW

CROSS REFERENCE TO RELATED APPLICATIONS

This application is a National Stage of International Application No. PCT/JP2021/015296 filed Apr. 13, 2021.

TECHNICAL FIELD

The present invention relates to a state monitoring device and a state monitoring method for a ball screw.

BACKGROUND ART

A ball screw, which has a screw shaft, a nut, and a plurality of balls such that the nut and the screw shaft move relative to each other via the balls, is known as a rolling linear motion device. Methods of monitoring the state of the ball screw are disclosed in, for example, Patent Literature Documents 1 and 2, in which the vibration of the ball screw is detected with a sensor and an abnormality is detected based on the detected vibration data.

Patent Literature Document 1 discloses a technique in which a data collection period T for capturing output signals of the sensor is set to be equal to or more than a period t in which the balls that move back and forth in an infinite circulation path enters a loaded passage from an unloaded passage, and state monitoring (status monitoring) is performed in consideration of vibration generated when the balls enter and exit the loaded passage.

Patent Literature Document 2 discloses a technique in which a trigger signal for obtaining a measurement timing is generated (prepared) from an acceleration signal acquired from the vibration acceleration sensor, and vibration measurement data is extracted only during steady speed operation to perform state monitoring.

LISTING OF REFERENCES

Patent Literature Documents

Patent Literature Document 1: Japanese Patent No. 6403743

Patent Literature Document 2: Japanese Patent Application Laid-Open Publication No. 2012-98213 (JP-A-2012-98213)

SUMMARY OF THE INVENTION

Problems to be Solved by the Invention

However, in the technique described in each of the above-mentioned Patent Literature Documents, the state monitoring is carried out by extracting a part of vibration data obtained when the nut of the ball screw that can reciprocate along a forward path and a return path moves in one of the two directions (the forward path direction or the return path direction). Therefore, there is a possibility that abnormality of a component of the ball screw, which clearly becomes detectable when the nut reaches a particular position, cannot be accurately detected.

The ball screw is used in various production equipment/machines such as a machine tool, a conveying device, and an injection molding machine, and it is desirable that the state monitoring of the ball screw is performed in-line so as not to affect the tact time of production (manufacturing) in the production equipment. However, the technology described in each of the above-mentioned Patent Literature Documents does not consider this point.

Therefore, an object of the present invention is to provide a state monitoring (status monitoring) device and a state monitoring method for a ball screw capable of appropriately collecting data for diagnosing a state of the ball screw with higher accuracy.

Another object of the present invention is to provide a state monitoring device and a state monitoring method for a ball screw capable of collecting data for diagnosing a state of a ball screw in-line without affecting a tact time in production.

Solutions to the Problems

In order to solve the above-mentioned problems, a device for monitoring a state of a ball screw according to one aspect of the present invention is directed to a state monitoring device to monitor the state of the ball screw having a screw shaft, a nut, and a plurality of balls. The state monitoring device for the ball screw includes a drive control unit configured to control a drive unit that causes the nut to move relative to the screw shaft at a constant speed under an unloaded condition for at least one reciprocating motion along a forward path and a return path. The state monitoring device for the ball screw also includes a data collection unit that collects, as data, a physical quantity related to the ball screw while the drive unit is being controlled by the drive control unit.

The unloaded condition refers to a condition or state in which the equipment having the ball screw does not perform processing on a workpiece and the ball screw is not subjected to any load caused by the workpiece processing. For example, if a processing apparatus such as a machine tool has a ball screw, the unloaded condition refers to a state in which a workpiece is not processed in the processing apparatus, and the ball screw is not subjected to any load generated upon processing of the workpiece. In other words, the unloaded condition is not a condition in which there is no load acting on the ball screw according to a device configuration or a product specification, i.e., a preload or a load due to the weight of a machining table may act on the ball screw under the "unloaded condition."

Since the ball screw is operated at a constant speed for one or more reciprocating motions under the unloaded condition (idling condition) and the data is collected while the ball screw is being operated, it is possible to collect diagnostic data that contribute to more accurate detection of abnormality of the components of the ball screw (e.g., damage to the screw shaft and damage to the nut), which has nut position dependency.

In the state monitoring device for the ball screw, the drive control unit may control the drive unit such that the reciprocating motion of the nut includes a nut moving section in which the nut would be caused to move under a loaded condition if an equipment having the ball screw is operated.

For example, if a processing apparatus such as a machine tool has a ball screw, abnormalities such as component damage are likely to occur in a section where a nut travels during processing. Since a section where the nut travels at the time of processing is included in the reciprocating path of the nut to which data collection is performed, abnormality detection can be appropriately performed.

In the state monitoring device for the ball screw, the drive control unit may include a drive condition storage unit that stores a drive condition for controlling the drive unit periodically under a same condition.

With this configuration, the collected data can be arranged in time series, and the trend of the collected data can be monitored. Therefore, when the state of the ball screw changes due to occurrence of an abnormality or the like, it is possible to appropriately detect the change in the state of the ball screw. In addition, since the data is collected under the same condition each time, the diagnostic accuracy can be improved.

The state monitoring device for the ball screw may further include an analysis unit that analyzes data collected by the data collection unit and monitors the state of the ball screw.

With this configuration, the collected data can be used to accurately detect abnormality of the components of the ball screw (e.g., damage to the screw shaft and damage to the nut) because the location of abnormality is dependent from the position of the nut. Thus, it is possible to carry out systematic preventive maintenance.

In the state monitoring device for the ball screw, the analysis unit may have a comparative diagnosis unit that compares an analysis result of data of the forward path with an analysis result of data of the return path among the data collected by the data collection unit, and diagnoses the state of the ball screw.

With this configuration, the diagnosis of the ball screw can appropriately be performed by utilizing the change in data between the forward path and the return path of the ball screw. Thus, it is possible to perform highly accurate state monitoring in which erroneous diagnosis due to measurement error or the like is suppressed or eliminated.

In the state monitoring device for the ball screw, the analysis unit may have an abnormal portion specifying unit that divides the data, which is collected by the data collection unit, into a plurality of data, and specifies a location of occurrence of abnormality in the ball screw based on an analysis result of the divided data.

With this configuration, it is possible to specify where the abnormality occurs in the ball screw. Upon knowing the location of the abnormality, it is possible to promptly perform maintenance or the like of the ball screw.

In order to solve the above-mentioned problems, there is provided another device for monitoring a state of a ball screw according to another aspect of the present invention, which is directed to a state monitoring device for the ball screw having a screw shaft, a nut, and a plurality of balls. The state monitoring device includes a period acquisition unit configured to acquire, as a data collection period, a period in which the nut is caused to move relative to the screw shaft at a constant speed in one direction under an unloaded condition within a predetermined operation cycle or a predetermined operation pattern of the ball screw. The state monitoring device also includes a data collection unit that collects, as data, a physical quantity related to the ball screw in the data collection period acquired by the period acquisition unit.

The unloaded condition refers to a condition or state in which the equipment provided with the ball screw does not perform any processing (machining) on a workpiece and the ball screw is not subjected to a load generated by the processing (machining). For example, if a processing apparatus such as a machine tool is provided with the ball screw, the unloaded condition means a state in which a workpiece is not processed in the processing apparatus, and the ball screw is not subjected to any load generated by the processing applied to the workpiece. In other words, the unloaded condition does not refer to a state in which there is no load acting on the ball screw due to a device configuration and/or a product specification, e.g., a preload may act on the ball screw under the unloaded condition, and a load due to the weight of a table of the machine tool may act on the ball screw under the unloaded condition.

As described above, in the operation cycle and operation pattern of the ball screw, the period during which the nut is moving at the constant speed in the particular direction under the unloaded condition is defined as the data collection period. Since the data is collected during this data collection period, it is possible to collect data, which will be used to diagnose the state of the ball screw, in-line (during the manufacturing process) without affecting the tact time of manufacturing.

In the state monitoring device for the ball screw, the period acquisition unit may acquire, as the data collection period, a period in which the ball screw makes a zero return movement (the ball screw returns to an original or start position). With this configuration, it is possible to collect data when the nut moves back to the predetermined position, e.g., when the nut moves back to the predetermined position upon starting up of the equipment having the ball screw, when the nut moves back to the predetermined position upon replacement of the tool, or when the nut moves back to the predetermined position upon replacement of the workpiece.

In the state monitoring device for the ball screw, the period acquisition unit may acquire, as the data collection period, a grease supply cycle of the ball screw. With this configuration, for example, after the lubricant (grease, oil) is replenished, it is possible to collect data when the nut travels at a constant speed for a predetermined distance in order to agitate the lubricant.

In the state monitoring device for the ball screw, the period acquisition unit may acquire the data collection period such that a moving area of the nut during the data collection period includes an area in which the nut is caused to move under a loaded condition during operation of an equipment having the ball screw.

For example, if a processing apparatus such as a machine tool has the ball screw, abnormalities such as component damage are likely to occur in a section where the nut moves during processing. Because the data collection period includes a section where the nut moves at the time of processing, abnormality detection can be appropriately performed.

In the state monitoring device for the ball screw, the period acquisition unit may periodically acquire the data collection period under a same condition.

With this configuration, the collected data can be arranged in time series, and the trend (change) of the data can be monitored. Therefore, when the state of the ball screw changes due to occurrence of an abnormality or the like, it is possible to appropriately detect the change. In addition, in consideration of the fact that the physical quantity (for example, vibration) related to the ball screw is different between the forward path and the return path, the data is collected when the nut is moving in the same direction each time. Thus, it is possible to improve the accuracy of the diagnosis.

The state monitoring device for the ball screw may further include an analysis unit that analyzes data collected by the data collection unit and monitors the state of the ball screw With this configuration, the state of the ball screw can be appropriately monitored by using the data collected in-line.

In the state monitoring device for the ball screw, the analysis unit may include an abnormal portion specifying unit that divides the data, which is collected by the data collection unit, into a plurality of data, and specifies a location of occurrence of abnormality in the ball screw based on an analysis result of the divided data.

With this configuration, it is possible to specify where the abnormality occurs in the ball screw. Thus, it is possible to promptly perform maintenance or the like of the ball screw.

In the state monitoring device for the ball screw, the physical quantity may be the vibration of the nut in the axial direction of the ball screw. With this configuration, the vibration generated in the nut can be appropriately detected.

The state monitoring device for the ball screw may further include a vibration sensor configured to detect vibration and provide vibration data. The vibration sensor may be fixed to the nut or may be fixed to a movable member that is operatively coupled to the nut and is movable relative to the screw shaft together with the nut. With this configuration, the vibration sensor can directly collect the physical information of the monitoring target. Thus, highly accurate state monitoring becomes possible.

In the state monitoring device for the ball screw, the drive unit may be a servo motor for driving the ball screw, and the physical quantity may be at least one of a torque and an electric current of the servo motor.

With this configuration, the torque and the electric current of the servo motor need only be detected. Thus, a complicated wiring for installing a sensor adapted to detect the physical quantity related to the ball screw is not required.

A method of monitoring a state of a ball screw according to still another aspect of the present invention is directed to a state monitoring method for monitoring the state of a ball screw having a screw shaft, a nut, and a plurality of balls. The method includes a step of controlling a drive unit that causes the nut to move relative to the screw shaft at a constant speed under an unloaded condition for at least one reciprocating motion along a forward path and a return path. The method also includes a step of collecting, as data, a physical quantity related to the ball screw while the drive unit is being controlled.

As described above, since the ball screw is operated at the constant speed under the unloaded condition for one or more reciprocating motions and the data is collected while the ball screw is being operated, it is possible to collect diagnostic data that contribute to more accurate detection of abnormality (e.g., damage to the screw shaft and damage to the nut) of the components of the ball screw, which has location dependency.

Another method of monitoring a state of a ball screw according to yet another aspect of the present invention is directed to another state monitoring method for monitoring the state of a ball screw having a screw shaft, a nut, and a plurality of balls. The method includes a step of acquiring, as a data collection period, a period in which the nut is caused to move relative to the screw shaft at a constant speed in one direction under an unloaded condition within a predetermined operation cycle of the ball screw or a predetermined operation pattern of the ball screw. The method also includes a step of collecting, as data, a physical quantity related to the ball screw in the data collection period.

As described above, in the operation cycle and operation pattern of the ball screw, the period during which the nut is moving at the constant speed in the particular direction under the unloaded condition is defined as the data collection period and the data is collected during the data collection period, it is possible to collect data for diagnosing the state of the ball screw in-line without affecting the tact time of manufacturing.

Advantageous Effects of the Invention

According to one embodiment of the present invention, since the ball screw is operated at a constant speed under an idling condition for one or more reciprocating motions (forward motion and return motion), it is possible to appropriately collect data for diagnosing the state of the ball screw with higher accuracy.

According to another embodiment of the present invention, it is possible to collect data for diagnosing the state of the ball screw in-line without affecting the tact time in production.

DETAILED DESCRIPTION OF THE EMBODIMENTS

Hereinafter, embodiments of the present invention will be described with reference to the drawings.

The scope of the present invention is not limited to the following embodiments, and can be arbitrarily changed within the scope of the technical concept of the present invention.

Figure 1:
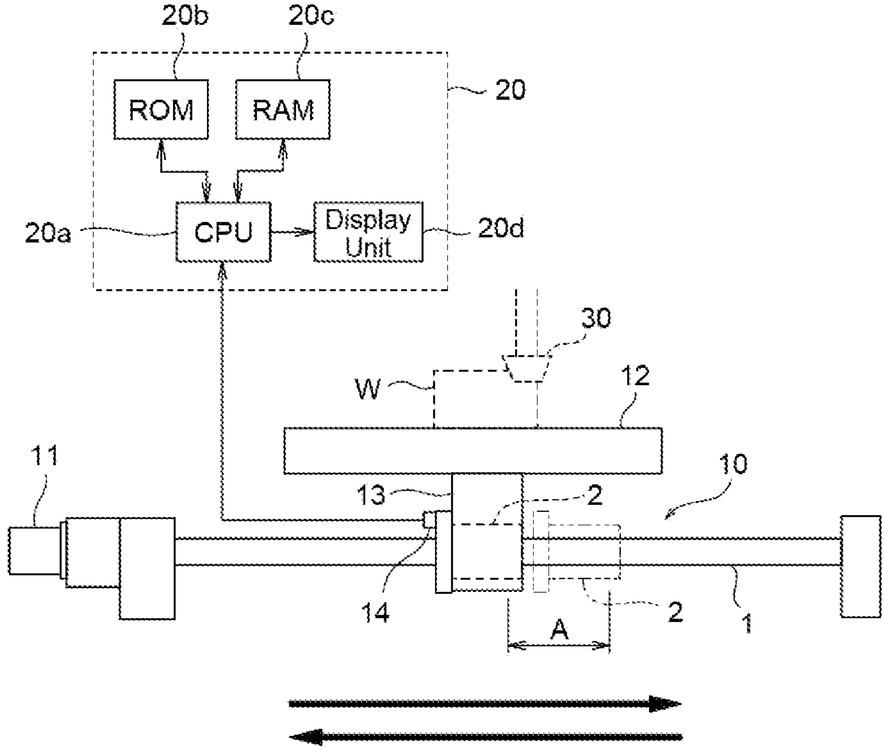
FIG. 1 illustrates a schematic configuration of a system including a state monitoring device according to a first embodiment of the present invention.

FIG. 1 illustrates a schematic configuration of a system including a state monitoring device 20 for monitoring a state of a ball screw 10.

As shown in FIG. 1, the ball screw 10 includes a screw shaft 1 and a nut 2. A rotary shaft of a servo motor 11 is connected to the screw shaft 1 via a coupling. The servo motor 11 is a drive unit that drives the ball screw 10. When the rotation of the servo motor 11 is transmitted to the screw shaft 1 to cause the screw shaft 1 to rotate, the nut 2 is moved in the axial direction of the screw shaft 1.

Figure 2:
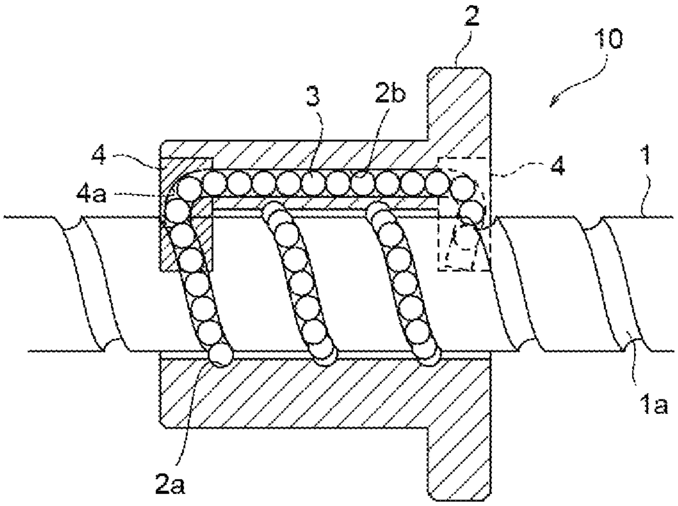
FIG. 2 illustrates an example of a ball screw.

FIG. 2 illustrates an example of the ball screw 10.

The screw shaft 1 of the ball screw 10 is formed of an elongated cylindrical metallic member. As shown in FIG. 2, a spiral rolling groove (spiral groove) la is formed on an outer surface of the screw shaft 1.

The nut 2 is formed of a substantially cylindrical metal member having a circular through-hole larger than an outer diameter of the screw shaft 1. A spiral rolling groove (spiral groove) 2*a* is formed on the inner peripheral surface of the nut 2 so as to correspond to (engage with) the spiral groove 1*a* of the screw shaft 1. The spiral groove 1*a* of the screw shaft 1 and the spiral groove 2*a* of the nut 2 form, in combination, a rolling path in which balls 3 of the ball screw roll.

The nut 2 has a straight ball return path 2*b* extending axially therein. The ball return path 2*b* is used to return the balls 3 from the end point to the start point of the rolling path.

Small fitting members 4 are embedded in opposite ends of the nut 2 in the axial direction. Each of the fitting members 4 is made of, for example, a resin member. A turning path 4*a* is formed in each of the fitting members 4. The turning path 4*a* communicates the rolling path to the ball return path 2*b*, and has a substantially arc shape. It should be noted that the material of the fitting members 4 is not limited to resin, e.g., the fitting members 4 may be made of metal.

The rolling path, which is formed by the two grooves (i.e., the spiral groove 1*a* of the screw shaft 1 and the spiral groove 2*a* of the nut 2), the ball return path 2*b* of the nut 2, and the turning paths 4*a* of the two fitting members 4 constitute, in combination, a circulation path through which the balls 3 circulate. A large number of balls 4 are loaded in the circulation path such that the screw shaft 1 and the nut 2 move relative to each other via the balls 3 rolling in the rolling path, which is a part of the circulation path. In the circulation path, therefore, the rolling path formed by the spiral groove 1*a* of the screw shaft 1 and the spiral groove 2*a* of the nut 2 defines a loaded area in which the balls 3 may be subjected to an external load, whereas a combination of the ball return path 2*b* of the nut 2 and the turning paths 4*a* of the fitting members 4 defines an unloaded area.

The balls 3 are subjected to an external load applied to the ball screw 10 in the rolling path and/or are subjected to a preload. Each of the balls 3 is made of a spherical metal member. It should be noted that the material of the balls 3 is not limited to metal, and may be ceramics or the like. Further, the rolling elements used in the ball screw 10 are not limited to the spherical balls 3, and may be rollers (needle or cylindrical rollers).

Although the ball screw 10 including the fitting members 4 has been described in the foregoing description as shown in FIG. 2, the circulation member for circulating the balls 3 is not limited to the above-described configuration. For example, the ball screw 10 may be a tube type or the like, i.e., the circulation type is not limited to a particular type.

In the following description of this embodiment, the ball screw 10 is used in a processing apparatus such as a machine tool.

As shown in FIG. 1, a table 12 on which a workpiece (object to be processed) W is placed is connected to the nut 2 of the ball screw 10 via a bracket 13. The table 12 can reciprocate (move forward and return) along the axial direction of the screw shaft 1 together with the nut 2. By moving the table 12, a desired portion (area) of the workpiece W can be processed by a tool 30 such as a cutting tool. For example, the entire surface of the workpiece W may be processed by moving the nut 2 in the processing section A shown in FIG. 1.

A vibration sensor 14 is fixed to an end face (nut flange end face) of the nut 2 in the axial direction. The vibration sensor 14 detects vibration in the traveling direction (axial direction) of the nut 2 as a physical quantity related to the ball screw 10. The physical quantity of the ball screw 10 detected by the vibration sensor 14 may be vibration in the circumferential direction of the nut 2. However, the axial vibration of the nut 2 (vibration in the axial direction of the ball screw) is more desirable as the physical quantity of the ball screw 10.

The vibration data detected by the vibration sensor 14 is sent to the state monitoring device 20.

The state monitoring device 20 can be constituted by, for example, a microcomputer. The state monitoring device 20 includes a CPU 20*a*, a ROM 20*b*, a RAM 20*c*, and a display unit 20*d*. For example, the CPU 20*a* loads a necessary program and the like from the ROM 20*b* into the RAM 20*c*, and executes the program and the like to realize various functional operations. Specifically, the CPU 20*a* realizes a monitoring function for monitoring the state or status of the ball screw 10 based on vibration data obtained from the vibration sensor 14. The display unit 20*d* includes a display monitor such as a liquid crystal display.

Figure 3:
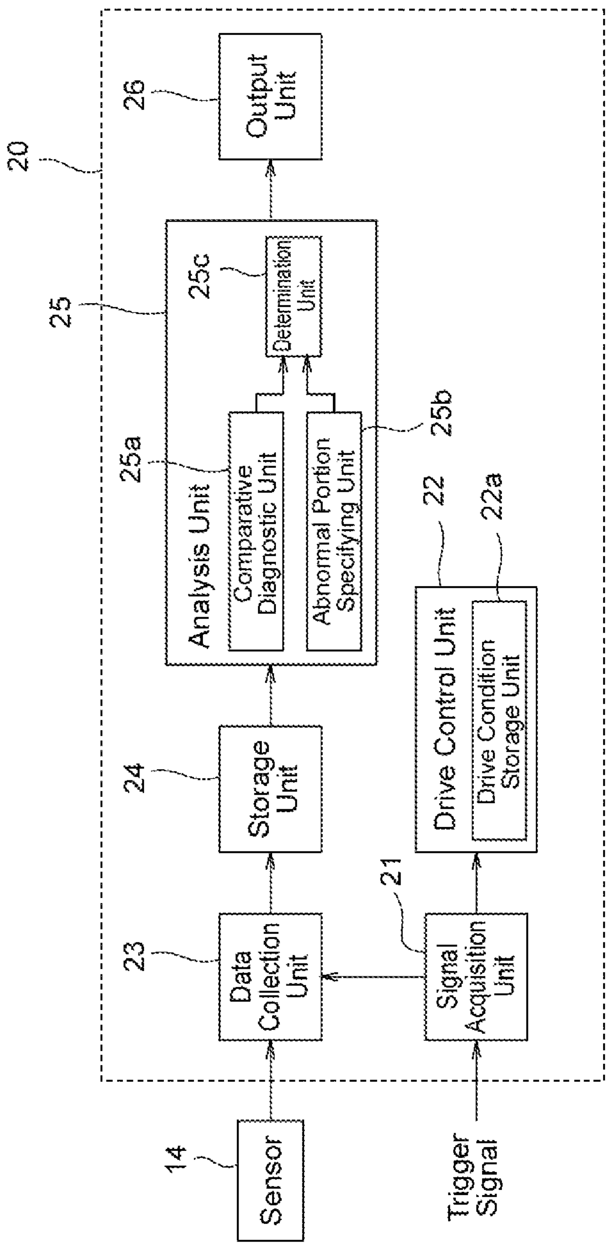
FIG. 3 is a functional block diagram of the state monitoring device according to the first embodiment.

FIG. 3 is a functional block diagram illustrating a functional configuration of the state monitoring device 20.

As illustrated in FIG. 3, the state monitoring device 20 includes a signal acquisition unit 21, a drive control unit 22, a data collection unit 23, a storage unit 24, an analysis unit 25, and an output unit 26. The functions of the respective units illustrated in FIG. 3 are realized by the CPU 20*a* (FIG. 1) when the CPU 20*a* executes relevant programs.

The signal acquisition unit 21 obtains a trigger signal from the equipment having the ball screw. The trigger signal is generated from the equipment when the workpiece W is not processed, e.g., before the workpiece W is processed or after the workpiece W is processed.

The drive control unit 22 controls the servo motor 11 (FIG. 1) as the trigger signal is acquired by the signal acquisition unit 21, and the drive control unit 22 actuates the ball screw 10 in a diagnosis mode. In the diagnosis mode, the ball screw 10 is operated at a constant speed for one or more reciprocating motions (moving back and forth at least one time along a forward path and a return path) under a no-load condition (idling condition). The idling condition means that the screw shaft 1 and the nut 2 are moved relative to each other under an unloaded condition in which the workpiece W is not processed. In the diagnosis mode, therefore, the drive control unit 22 causes the nut 2 to move back and forth relative to the screw shaft 1 at a constant speed for one or more times (one or more reciprocating motions) under the unloaded condition.

The unloaded condition refers to a condition or state in which the workpiece is not processed in the processing apparatus, and the ball screw 10 is not subjected to any load generated by the processing of the workpiece. That is, the unloaded condition (unloaded state) does not mean a state in which there is no load acting on the ball screw 10 due to the device configuration or the product specification, such as a preload or a load derived from the weight of the table 12.

As the number of reciprocating motions (moving forward and returning) of the idle operation increases, an amount of data collected increases, and a noise component can be reduced by averaging, so that it is desirable that the number of reciprocating motions is larger. As the number of reciprocating motions increases, the accuracy of the state monitoring increases. In addition, from the viewpoint of SN (signal-noise) ratio, it is desirable that the rotational speed of the screw shaft 1 be equal to or higher than 100 rpm.

As the conditions of the idling operation, the moving path of the nut 2 may include a path where the nut 2 moves under the loaded condition during the operation of the equipment having the ball screw 10, i.e., the path where the nut 2 moves during the processing of the workpiece W in the processing apparatus (processing path A in FIG. 1). An amount of data collected increases as the moving path of the nut 2 is longer. A noise component can be more reduced by averaging if an amount of data is large. Thus, it is desirable that the traveling distance (moving path) of the nut 2 is longer. The longer the traveling distance, the higher the accuracy of the state monitoring.

The drive control unit 22 causes the ball screw 10 to move under the above-described unloaded condition (idling condition), and then ends the diagnosis mode.

The data collection unit 23 starts collection of the vibration data detected by the vibration sensor 14 as the trigger signal is acquired by the signal acquisition unit 21. That is, the data collection unit 23 collects the vibration data in synchronization with the idling operation of the ball screw 10.

When the diagnosis mode is ended by the drive control unit 22, the data collection unit 23 stops the data collection of the vibration data.

The storage unit 24 stores the vibration data collected by the data collection unit 23 in a predetermined storage area.

In this embodiment, the state monitoring device 20 periodically drives the ball screw 10 in the diagnosis mode to collect vibration data. Conditions for collecting the vibration data (operation pattern, sampling time, data collection time, and the like) are the same each time. As illustrated in FIG. 3, the drive control unit 22 includes a drive condition storage unit 22*a* that stores conditions such as the operation pattern, and the drive control unit 22 controls the servo motor 11 based on the conditions stored in the drive condition storage unit 22*a*.

When the stability/reliability of the data is taken into consideration, it is desirable to collect the data after the warming up of the ball screw 10. Also, in order to appropriately detect the occurrence of an abnormality, it is desirable that the data collection is carried out one or more times a day (operation day).

The analysis unit 25 analyzes the vibration data, which is collected while driving (actuating) the ball screw 10 in the diagnostic mode, and monitors the state of the ball screw 10.

The output unit 26 sends the state (status) information of the ball screw 10, which is the diagnosis result generated by the analysis unit 25, to the display unit 20*d* shown in FIG. 1, and presents the diagnosis result to the user.

For example, the analysis unit 25 calculates a feature value (characteristic value) based on the collected vibration data, and compares the calculated characteristic value with a reference value to diagnose a state (presence or absence of occurrence of abnormality, etc.) of the ball screw 10. The characteristic value may include at least one of a RMS (root mean square) value, an overall value (OA value), a partial overall value (POA value), a crest factor (CF), and a kurtosis. It should be noted that the characteristic value is not limited to the above-mentioned values, and may be appropriately selected under given circumstances. If a threshold value to the characteristic value is set as the reference value in advance, the abnormality can be easily and appropriately determined by comparing the characteristic value with the threshold value.

In the analysis of the vibration data, the analysis unit 25 may divide the vibration data into a plurality of portions, i.e., vibration data of a forward movement (forward path) portion, vibration data of a return movement (return path) portion, vibration data of processing (machining) in the forward and return movement portions, and vibration data of no-processing in the forward and return movement portions. Then, the analysis unit 25 may compare the analysis results (for example, the above-described characteristic values) of the respective vibration data with each other.

For example, as illustrated in FIG. 3, the analysis unit 25 may include a comparative diagnostic unit 25*a*, an abnormal portion (location) specifying unit 25*b*, and a determination unit 25*c*. In this configuration, the comparative diagnostic unit 25*a* may compare the analysis results of the divided vibration data, and the determination unit 25*c* may determine the status of the ball screw 10 based on the comparison results generated by the comparative diagnostic unit 25*a*.

By comparing the characteristic value calculated from the vibration data of the forward path with the characteristic value calculated from the vibration data of the return path, it is possible to confirm variations (irregularities) in the vibration data.

Vibrations occur in the ball screw 10 as the balls 3 roll in the rolling path. Vibrations also occur in the ball screw 10 as the balls 3 enter and exit the loaded area and the unloaded area of the circulation path, and the like. In the ball screw 10, a position at which each of the balls 3 transitions from the loaded area to the unloaded area and a position at which each of the balls 3 transitions from the unloaded area to the loaded area are reversed as a moving direction of the nut 2 reverses. In other words, the start position of the vibration is different between the forward path and the return path of the nut 2. Therefore, the same vibration data is not measured in the forward path and the return path.

Therefore, when the comparative diagnostic unit 25*a* shown in FIG. 3 compares the characteristic value of the forward path with the characteristic value of the return path, it is possible to carry out the state monitoring using the change in the vibration data between the forward path and the return path, and it is possible to perform highly accurate state monitoring in which erroneous diagnosis due to a measurement error or the like is suppressed or eliminated.

Further, by comparing the characteristic value calculated from the vibration data of the processing area with the characteristic value calculated from the vibration data outside the processing area, it is possible to detect the deterioration and damage state of the ball screw in the processing area.

In general, in the ball screw 10, an abnormality is likely to occur in a processing area (processing portion) to which a load is applied. Therefore, if it is assumed in advance that abnormality occurs only in the processing area and no abnormality occurs outside the processing area (i.e., the characteristic value outside the processing area is assumed to be in a normal value range), then it is possible to easily determine the state of the ball screw, without relying upon time-series data of the characteristic value, by simply comparing the characteristic value of the processing area with the characteristic value outside the processing area (the normal range value). That is, the comparative diagnostic unit 25*a* illustrated in FIG. 3 may compare the characteristic value of the processing area with the characteristic value outside the processing area.

The analysis unit 25 may divide the vibration data of the entire area into data of a plurality of small areas, and compare the analysis results (e.g., characteristic values) of the divided vibration data. This makes it possible to identify a location at which the state of the ball screw changes. For example, if there is a flaw at a certain position on the rolling surface of the screw shaft 1, the characteristic value changes when the nut 2 moves over the flaw.

Figure 4:
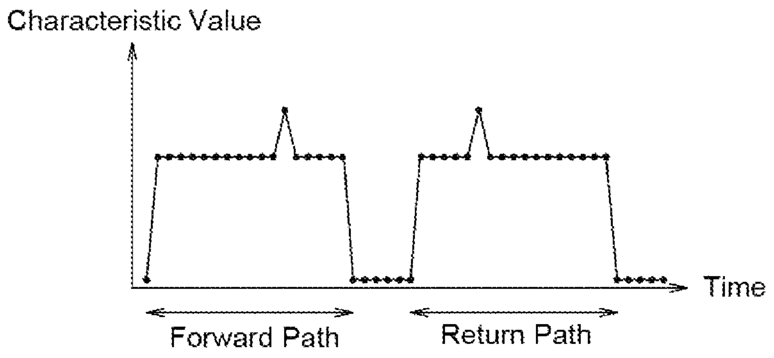
FIG. 4 is a diagram useful to describe a method of identifying a location of abnormality occurrence according to the first embodiment.

FIG. 4 is an example of a characteristic value when there is a flaw at one position on the rolling surface of the screw shaft 1. FIG. 4 shows characteristic values for one reciprocal motion (forward path and return path). Each dot in FIG. 4 represents a characteristic value calculated from vibration data of each area. As understood from the drawing, if there is a flaw in one area of the rolling surface of the screw shaft 1, it is possible to confirm a portion (peak) where the characteristic value greatly fluctuates in each of the forward path and the return path. Therefore, by specifying the portion where the characteristic value changes, it is possible to specify the position where the flaw of the screw shaft 1 is generated (abnormality occurrence portion).

The abnormal portion (location) specifying unit 25*b* illustrated in FIG. 3 may divide the vibration data of the entire area into a plurality of data as described above, and specify the abnormal portion of the ball screw 10 based on the analysis results of the divided data.

If a flaw exists at one position on the rolling surface of the screw shaft 1 as described above, there is always a peak of the characteristic value in each of the forward path and the return path. Therefore, when the peak of the characteristic value exists only in one of the forward path and the return path, it can be determined that the peak is an error in the measurement. Accordingly, the diagnostic accuracy can be improved by comparing the vibration data of the forward path with the vibration data of the return path.

Specifically, the comparative diagnostic unit 25*a* shown in FIG. 3 may compare the vibration data of the forward path with the vibration data of the return path, and the determination unit 25*c* may determine, based on the result of comparing the vibration data of the forward path with the vibration data of the return path by the comparative diagnostic unit 25*a* and the abnormality occurrence location identified by the abnormality portion specifying unit 25*b*, whether the peak of the detected characteristic value is caused by the error of the measurement or caused by the abnormality that actually occurred on the screw shaft 1.

Since the start positions of the vibration caused by the collision of the rolling elements are different between the forward path and the return path, it is desirable to consider the difference between the vibration start positions.

It should be noted that the analysis unit 25 may diagnose the state of the ball screw 10 by arranging the characteristic values calculated from the above-mentioned plural vibration data (i.e., the vibration data of the forward path, the vibration data of the return path, the vibration data of the processing area, and the vibration data of the no-processing area) in time series and monitoring the change in the tendency of the characteristic values.

With this diagnosis, the state of the ball screw 10 can be diagnosed with higher accuracy. Alternatively, the analysis unit 25 may arrange the characteristic values calculated from the vibration data in time series, without dividing the vibration data into the forward path, the return path, the processing area, and the no-processing area, and monitor the change in the tendency of the characteristic values. Although the accuracy of the state monitoring of this diagnosis is inferior, the calculation can be simplified, and the memory required for the analysis can be reduced.

In this embodiment, described is the configuration in which the state monitoring device 20 includes the respective units illustrated in FIG. 3, but for example, at least one of the storage unit 24, the analysis unit 25, and the output unit 26 may be provided in a separate device other than state monitoring device 20. In such configuration, the state monitoring device 20 may transmit the data collected by the data collection unit 23 to the separate device other than the state monitoring device 20 such that the separate device may analyze the data to diagnose the state of the ball screw 10.

As described above, the state monitoring device 20 of this embodiment controls the servo motor 11 to cause the nut 2 to move relative to the screw shaft 1 at a constant speed for one or more reciprocating motions under the unloaded condition, thereby actuating the ball screw 10 in the diagnostic mode. In the meantime, the state monitoring device 20 collects the vibration data which will be used to monitor the state of the ball screw 10.

Since the state monitoring device 20 can actuate the ball screw 10 in the diagnostic mode in the above-described manner, it is possible for the state monitoring device 20 to perform data collection appropriately even if the equipment to be monitored does not have an idling operation at a constant speed for one or more reciprocating motions during a series of operation cycles. Further, since the state monitoring device 20 collects the vibration data during the idling operation time, not during the processing time, it is possible for the state monitoring device 20 to collect the vibration data while minimizing influence of disturbance generated during the processing. Further, since the idling operation is carried out one or more reciprocations, it is possible to improve the accuracy of the state monitoring. In addition, since the idling operation is performed at a constant speed, stable data measurement can be performed.

The idling movement section may include a section (area) in which the nut 2 of the ball screw 10 will move while processing is performed. This makes it possible to include, in the collected vibration data, a signal (data) when the nut moves over an area or portion where an abnormality is likely to occur. Therefore, for example, by comparing the characteristic value calculated from the vibration data of the processing area with the characteristic value calculated from the vibration data outside the processing area, it is possible to find the deterioration and damage in the processing area. In this way, abnormality detection can be appropriately performed.

The nut moving area and the nut moving distance of the idling operation can be decided based on predetermined parameters, such as the processing area A as well as the operation cycle of the ball screw 10 and the type of the ball screw 10.

For example, as in the technique described in Patent Literature Document 1, when the data collection time is set to be equal to or more than the passage period of the ball, a system for detecting (obtaining) the passage period of the ball is required. On the other hand, in this embodiment, it is not necessary to separately prepare a complicated system for obtaining parameters necessary to set conditions of the idling operation.

Further, in this embodiment, by periodically actuating the ball screw 10 under the same conditions and performing the vibration data collection, it is possible to arrange the collected vibration data in time series, and to monitor the tendency of the vibration data. Therefore, when the state of the ball screw changes due to occurrence of an abnormality or the like, it is possible to appropriately detect the changed state. Since the vibration data is collected under the same condition each time, the diagnostic accuracy can be improved.

For example, when a trigger signal is produced from an acceleration signal as in the technique described in Patent Literature Document 2, it is not always possible to collect data of the same condition each time. In this embodiment, on the other hand, the data is collected when the ball screw 10 is actuated in the predetermined diagnosis mode, and therefore data of the same condition can be collected each time.

As described above, this embodiment uses the values measured during the idling operation at the constant speed for one or more reciprocating motions to detect the damage of the screw shaft 1, the damage of the nut 2 and the like, which has the dependency of the position. Thus, it is possible to accurately detect which part of the ball screw 10 is damaged. This contributes to systematic preventive maintenance.

Second Embodiment

Next, a second embodiment of the present invention will be described.

The above-described first embodiment deals with a configuration in which the state of the ball screw 10 is diagnosed by using the measured values obtained when the screw shaft 1 and the nut 2 are moved relative to each other at a constant speed under the unloaded condition for one or more reciprocating motions. In the second embodiment, the state of the ball screw 10 is diagnosed by using values measured while the screw shaft 1 and the nut 2 are moved relative to each other at a constant speed in one direction under the unloaded condition within a predetermined operation cycle or operation pattern.

Figure 5:
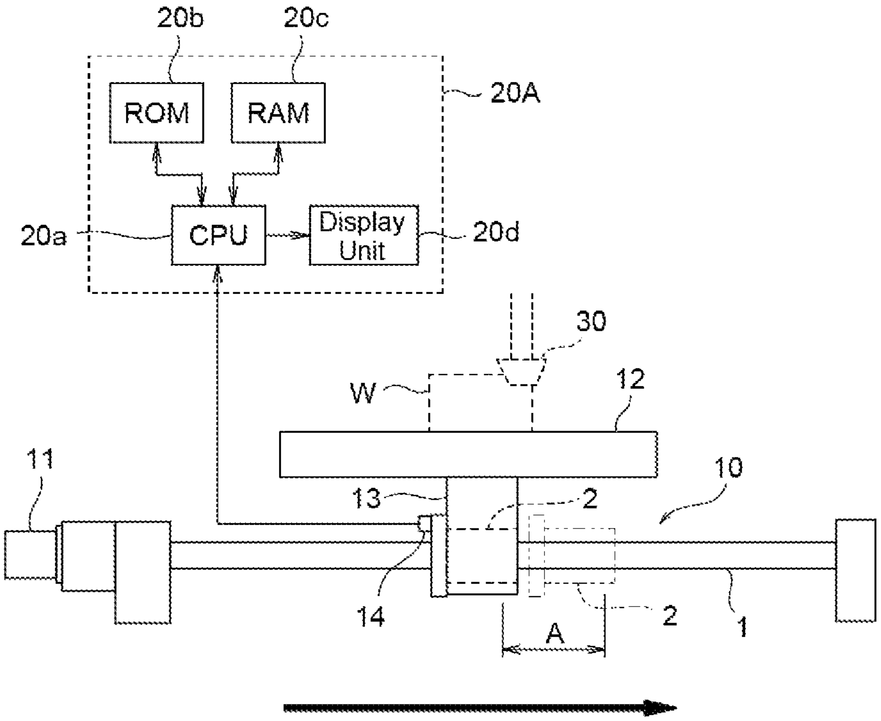
FIG. 5 illustrates a schematic configuration of a system including a state monitoring device according to a second embodiment of the present invention.

FIG. 5 is a diagram illustrating a schematic configuration of a system that includes a state monitoring device 20A of the second embodiment.

The hardware configuration of the state monitoring device 20A is the same as the hardware configuration of the state monitoring device 20 shown in FIG. 1.

Figure 6:
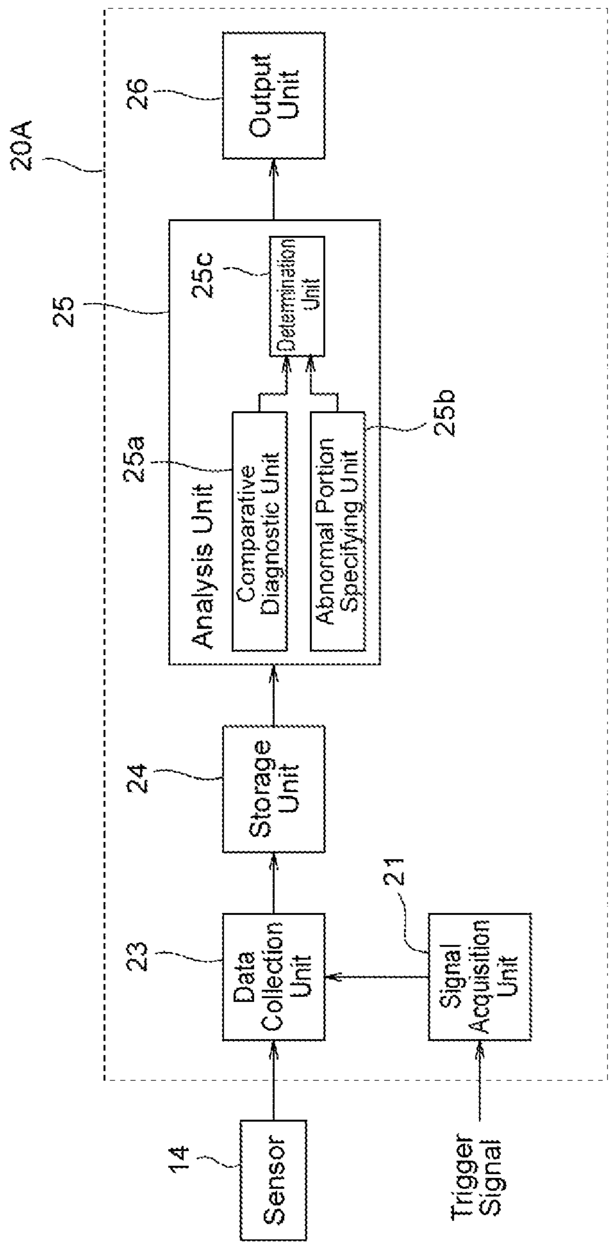
FIG. 6 is a functional block diagram of a state monitoring device according to the second embodiment.

FIG. 6 is a diagram illustrating a functional configuration of the state monitoring device 20A of the second embodiment.

As illustrated in FIG. 6, the state monitoring device 20A includes a signal acquisition unit 21, a data collection unit 23, a storage unit 24, an analysis unit 25, and an output unit 26. The functions of the respective units illustrated in FIG. 6 are realized by CPU 20*a* illustrated in FIG. 5 as the CPU 20*a* executes predetermined programs. Some functions of the units illustrated in FIG. 6 are different from the functions of the units of the state monitoring device 20 illustrated in FIG. 3.

The signal acquisition unit 21 obtains a trigger signal from the equipment having the ball screw. The trigger signal is a signal indicating a period during which the nut 2 moves relative to the screw shaft 1 at a constant speed in one direction under the unloaded condition within the operation cycle or the operation pattern of the ball screw 10.

The unloaded condition refers to a state in which the workpiece is not processed in the processing apparatus, and the ball screw 10 is not subjected to any load generated by the processing of the workpiece. That is, the unloaded condition does not mean a state in which there is no load acting on the ball screw 10 due to the device configuration and the product specification, e.g., a preload may be applied under the unloaded condition and a load due to the weight of the table 12 may be applied under the unloaded condition.

The ball screw 10 performs an operation of returning to the origin position (zero return) upon, for example, starting of the equipment, replacement of the tool 30, replacement of the workpiece W, and the like. Therefore, the signal acquisition unit 21 may obtain, for example, a trigger signal that indicates a period during which the ball screw 10 returns to the origin.

The ball screw 10 may have a grease supply cycle. During the grease supply cycle, lubricant (grease, oil) is supplied to the ball screw 10, and then the ball screw 10 is caused to travel at a constant speed for a predetermined distance in order to stir the lubricant within the ball screw. Therefore, the signal acquisition unit 21 may obtain, for example, a trigger signal indicating that the ball screw is in the grease supply cycle.

For example, the signal acquisition unit 21 may use (decide) a predetermined period from the timing of receiving the trigger signal, as a period in which the nut 2 moves relative to the screw shaft 1 in one direction at a constant speed under the unloaded condition within the operation cycle or the operation pattern of the ball screw 10, i.e., as a data collection period. The signal acquisition unit 21 may obtain the data collection period in this manner. Alternatively, the signal acquisition unit 21 may obtain the data collection period by receiving a trigger signal indicating the start of the data collection period and another trigger signal indicating the end of the data collection period. In this embodiment, the signal acquisition unit 21 corresponds to a period acquisition unit.

In this way, the signal acquisition unit 21 acquires, as the data collection period, a period in which the nut 2 moves in one direction, rather than two directions (the forward direction and the return direction). Therefore, data collection can be performed in a relatively short time. From the viewpoint of SN ratio, it is desirable that the data collection period is a period in which the rotational speed of the screw shaft 1 is equal to or higher than 100 rpm.

The moving area of the nut 2 along the screw shaft when the nut 2 moves during the data collection period may include an area in which the nut 2 moves under a loaded condition during operation of the equipment having the ball screw 10, i.e., an area in which the nut 2 moves during processing of the workpiece W in the processing apparatus (processing area A in FIG. 5). An amount of data collected increases as the moving area (moving distance) of the nut 2 increases, and the noise component can be reduced by averaging. Thus, it is desirable that the moving distance (traveling distance) is longer. The longer the moving distance, the better the accuracy of the state monitoring.

In this embodiment, the signal acquisition unit 21 acquires the data collection period based on the trigger signal, but the method of acquiring the data collection period is not limited thereto. For example, the signal acquisition unit 21 may acquire the operation cycle information of the ball screw 10 and determine the data collection period based on the acquired information.

The data collection unit 23 collects the vibration data, which is supplied from the vibration sensor 14, in the data collection period defined or obtained by the signal acquisition unit 21. Specifically, the data collection unit 23 collects the vibration data in synchronization with the operation cycle (processing cycle) of the ball screw 10 in production time.

The storage unit 24 stores the vibration data, which is collected by the data collection unit 23, in a predetermined storage area.

According to this embodiment, the state monitoring device 20A periodically collects vibration data. Conditions for collecting vibration data (operation pattern, moving direction of the nut 2, sampling time, data collection time, and the like) are the same each time.

In the ball screw 10, vibrations are caused by, for example, the balls 3 rolling along the rolling path, and another vibrations are caused by the balls 3 entering and exiting the loaded area and the unloaded area of the circulation path. In the ball screw 10, a position at which the ball transitions from the loaded area to the unloaded area and a position at which the ball transitions from the unloaded area to the loaded area are reversed according to a moving direction of the nut 2. That is, the vibration starting positions are different between the forward path and the return path. Therefore, the same vibration data is not measured in the forward path and the return path. Thus, when the vibration data is collected periodically, the vibration data is collected under the condition that the moving direction of the nut 2 is always the same.

When the stability of the data is taken into consideration, it is desirable to collect the data in a warm state of the equipment (after the warming-up period of the equipment). In order to appropriately grasp the occurrence of an abnormality, it is desirable that the data collection is carried out two times or more a day (operation day).

In FIG. 5, the arrow indicating the moving direction of the nut 2 shows the right direction, but the moving direction of the nut 2 during the data collection period may be the left direction.

The analysis unit 25 analyzes the vibration data, which is stored in the storage unit 24, and monitors the state of the ball screw 10.

The output unit 26 outputs (displays) the state of the ball screw 10, which is the diagnosis result of the analysis unit 25, on the display unit 20*d* shown in FIG. 5 to present the diagnosis result to the user.

For example, the analysis unit 25 calculates a characteristic value based on the collected vibration data, and compares the calculated characteristic value with a reference value to diagnose a state of the ball screw 10 (presence or absence of abnormality, etc.). The characteristic value may include at least one of a RMS value, an overall value (OA value), a partial overall value (POA value), a crest factor (CF), and a kurtosis. It should be noted that the characteristic value is not limited to the above-mentioned values, and can be appropriately selected. If a threshold value of the characteristic value is set to the reference value in advance, the abnormality can be easily and appropriately detected by comparing the characteristic value with the threshold value.

When analyzing the vibration data, the analysis unit 25 may divide the vibration data into two groups, i.e., vibration data of the processing area and vibration data of the no-processing area, and compare analysis results (for example, the above-described characteristic values) of the respective vibration data.

For example, as illustrated in FIG. 6, the analysis unit 25 may include a comparative diagnostic unit 25*a*, an abnormal portion (location) specifying unit 25*b*, and a determination unit 25*c*. In this configuration, the comparative diagnostic unit 25*a* may compare the analysis results of the divided vibration data, and the determination unit 25*c* may determine the state of the ball screw 10 based on the comparison results prepared by the comparative diagnostic unit 25*a*.

By comparing the characteristic value calculated from the vibration data of the processing area with the characteristic value calculated from the vibration data outside the processing area (vibration data of the no-processing area), it is possible to detect or determine the deterioration and damage in the processing area.

In general, in the ball screw 10, an abnormality is likely to occur in a processing area to which a load is applied. Therefore, if it is assumed in advance that abnormality occurs only in the processing area and no abnormality occurs outside the processing area (i.e., normal value is obtained outside the processing area), then it is possible to easily determine the state of the ball screw by simply comparing the characteristic value of the processing area with the characteristic value outside the processing area (normal value), without having time-series data of the characteristic values. For example, it is still possible to monitor (diagnose) the state of the ball screw even if the equipment operation patterns suitable for the data collection period are set to be extremely few in order to shorten the tact time as much as possible. That is, the comparative diagnostic unit 25*a* illustrated in FIG. 6 may compare the characteristic values of the processing area with the characteristic values outside the processing area.

Alternatively, the analysis unit 25 may divide the vibration data of the entire area into data of a plurality of small areas, and compare the analysis results (e.g., characteristic values) of the divided vibration data with each other. This makes it possible to identify a position at which the state of the ball screw changes. For example, if there is a flaw in one area on the rolling surface of the screw shaft 1, the characteristic value changes only when the nut 2 moves over the flaw.

Figure 7:
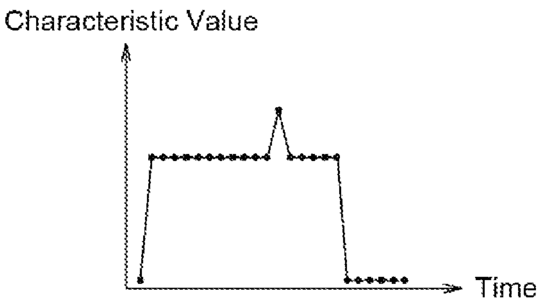
FIG. 7 is a diagram useful to describe a method of identifying a location of abnormality occurrence according to the second embodiment.

FIG. 7 illustrates an example of characteristic values when a flaw exists at one position on the rolling surface (surface on which the balls roll) of the screw shaft 1. Each dot in FIG. 7 represents a characteristic value calculated from the vibration data of each small area which is defined by dividing the entire moving path of the nut. In this way, when there is a flaw at one position on the rolling surface of the screw shaft 1, a portion (peak) where the characteristic value greatly fluctuates can be detected. Therefore, by specifying the portion (peak) where the characteristic value changes, it is possible to determine the position where the flaw of the screw shaft 1 exists (abnormality occurrence location).

The abnormal portion specifying unit 25*b* illustrated in FIG. 6 may divide the vibration data of the entire area into a plurality of data as described above, and specify the abnormal portion of the ball screw 10 (location of occurrence of the abnormal state) based on the analysis results of the divided data.

Since the start position of the vibration caused by the collision of the rolling elements in the forward path is different from that in the return path, it is desirable to consider the difference between the vibration start position in the forward path and the vibration start position in the return path. Therefore, when vibration data is collected in-line, it is desirable to collect the vibration data of the forward path only or the return path only.

It should be noted that the analysis unit 25 may be configured to diagnose the state of the ball screw 10 by arranging the characteristic values calculated from the divided vibration data, i.e., the vibration data of the processing area and the vibration data of the no-processing area, in time series and monitoring the change in the tendency of the characteristic values. This analysis unit can diagnose the state of the ball screw 10 with higher accuracy.

Alternatively, the analysis unit 25 may arrange in time series the characteristic values calculated without dividing the vibration data into the processing area and the no-processing area, and monitor the change in the tendency of the characteristic values. Although this analysis unit cannot carry out a simple diagnosis, which uses comparison between the characteristic values of the processing area and the characteristic values of the no-processing area, the calculation can be simplified, and the memory required for the analysis can be reduced.

The state monitoring device 20A of this embodiment includes the respective units illustrated in FIG. 6, but, for example, at least one of the storage unit 24, the analysis unit 25, and the output unit 26 may be included in a separate device other than the state monitoring device 20A. In such configuration, the state monitoring device 20A may transmit the data, which is collected by the data collection unit 23, to the separate device other than the state monitoring device 20A, and the separate device may analyze the data to diagnose the state of the ball screw 10.

As described above, the state monitoring device 20A of this embodiment obtains, as the data collection period, a period in which the nut 2 moves relative to the screw shaft 1 at a constant speed in one direction under the no-load condition within the operation cycle or the operation pattern of the ball screw 10. Then, the state monitoring device collects vibration data of the data collection period as data for monitoring the state of the ball screw 10.

In this way, the state monitoring device 20A collects the vibration data during the unloaded time, rather than collecting the vibration data during processing. Therefore, it is possible to collect vibration data that minimizes the influence of disturbance generated during processing. Further, since the vibration data is collected during the operation cycle or the operation pattern of the ball screw 10, it is not necessary to intervene the diagnostic mode (i.e., it is not necessary to additionally carry out the diagnostic mode) for data collection. Therefore, it is possible to prevent a decrease in productivity. In addition, since the data collection area is not reciprocating areas, but a one-way area in which the nut 2 is moved in one direction (forward direction or return direction), the measurement time can be shortened. Furthermore, since vibration data is collected during the period in which the nut 2 is moving at a constant speed, stable data measurement can be performed.

Also, the nut moving area in which the nut 2 moves during the data collection period may include an area in which the nut 2 of the ball screw 10 moves when processing is performed. This makes it possible to include, in the collected vibration data, a signal generated when the nut moves over a portion (position) where an abnormality is likely to occur. Therefore, for example, by comparing the characteristic value calculated from the vibration data of the processing area with the characteristic value calculated from the vibration data outside the processing area, it is possible to grasp the deterioration and damage in the processing area. In this way, abnormality detection can be appropriately performed.

The moving area and the moving distance of the nut 2 in the data collection period can be set based on predetermined parameters such as the processing area A as well as the operation cycle of the ball screw 10 and the type of the ball screw 10.

For example, as in the technique described in Patent Literature Document 1, when the data collection time is set to be equal to or longer than the passage period of the balls, a system for knowing the passage period of the balls is required. In this embodiment, on the other hand, it is not necessary to separately prepare a complicated system for knowing the parameters necessary for setting the data collection period.

Further, in this embodiment, the vibration data is periodically (repeatedly) collected under the same conditions. Thus, the collected vibration data can be arranged in time series and the tendency of the vibration data can be monitored. Therefore, when the state of the ball screw changes due to occurrence of an abnormality or the like, it is possible to appropriately detect the change of the state of the ball screw. Since the vibration data of the nut 2 that moves in the same direction is collected each time, the diagnostic accuracy can be improved.

For example, if a trigger signal is prepared from an acceleration signal as in Patent Literature Document 2, it is not always possible to collect data of the same condition each time. In this embodiment, on the other hand, since the data is only collected for a period in which the nut 2 moves in a predetermined area at a constant speed in one direction, it is possible to collect data under the same condition each time.

As described above, in this embodiment, the measurement values under the unloaded condition during a manufacturing process are used. Thus, even in the equipment whose tact time is short and which is operated 24 hours, it is possible to collect data during a series of operation cycles without stopping the manufacturing process. As a result, the state of the ball screw 10 can be monitored in line without adversely affecting the tact time of the manufacturing process. Accordingly, preventive maintenance can be carried out according to a planned schedule.

Modifications

Although each of the above-described embodiments deals with the configuration in which the vibration sensor 14 is fixed to the nut 2 of the ball screw 10, the position at which the vibration sensor 14 is fixed is not limited to the nut. When the vibration sensor 14 cannot be fixed to the nut 2 of the ball screw 10 due to the structure of the equipment, the vibration sensor 14 may be fixed to a moving member that is movable relative to the screw shaft 1 together with the nut 2 in the vicinity of the nut 2 or in an area close to the nut 2 as much as possible. Examples of such moving member include the table 12 and the bracket 13 illustrated in FIG. 1. The vibration detected by the vibration sensor 14 may be vibration in the axial direction or vibration in the circumferential direction, but the vibration in the axial direction is more desirable.

Although each of the above-described embodiments deals with the configuration in which the vibration of the nut 2 is detected as the physical quantity related to the ball screw 10, the physical quantity related to the ball screw may be the torque or the current of the servo motor 11. In such configuration, the wiring used to dispose the sensor for detecting the physical quantity related to the ball screw 10 becomes easier/simpler than the configuration of detecting the vibration data. However, while the vibration data directly represents (indicates) the physical information of the monitoring target, the torque information and the electric current data include a considerable amount of information on other elements such as a bearing and a guide mechanism. Thus, the diagnostic accuracy tends to be slightly lower when the torque and/or the electric current is used than when the vibration data is used.

Although each of the above-described embodiments deals with the configuration in which the characteristic value is calculated based on the collected vibration data, and the characteristic value is compared with the reference value to determine the state of the ball screw, the characteristic value may not be calculated, i.e., the waveform of the vibration data may be directly compared with a reference waveform to determine the state of the ball screw.

Although each of the above-described embodiments deals with the configuration in which the processing apparatus such as a machine tool has the ball screw 10, the equipment having the ball screw 10 may be a conveyance apparatus, an injection molding machine, or other production equipment. Even if the equipment having the ball screw is the conveyance apparatus or the like, it is still possible to appropriately collect data for diagnosing the state of the ball screw 10 with higher accuracy, as in the above-described embodiments.

It should be noted that the present invention may be realized by supplying a program, which is designed to realize one or more functions of the above-described embodiments, to a system or an apparatus via a network or a storage medium, and reading and executing the program by one or more processors in a computer of the system or the apparatus. In such configuration, the program itself, which is read from the recording medium, realizes the functions of the embodiment(s). In addition, the recording medium on which the program is recorded can constitute the present invention.

The way of realizing the functions of the embodiments is not limited to causing the computer to read and execute the program so as to realize the functions of the embodiments. Specifically, the functions of the above-described embodiments may be realized by the operating system (OS) or the like running on the computer and performing some or all of the processing based on the instructions of the program.

REFERENCE NUMERALS AND SYMBOLS

1 . . . Screw shaft, 1*a* . . . Spiral groove, 2 . . . Nut, 2*a* . . . Spiral groove, 2*b* . . . Ball return path, 3 . . . Ball, 4 . . . Fitting member, 4*a* . . . Turning path, 10 . . . Ball screw, 11 . . . Servo motor, 12 . . . Table, 13 . . . Bracket, 14 . . . Vibration sensor, 20 . . . State monitoring device, 21 . . . Signal acquisition unit, 22 . . . Drive control unit, 23 . . . Data collection unit, 24 . . . Storage unit, 25 . . . Analysis unit, 26 . . . Output unit, 30 . . . Tool, A . . . Processing area, W . . . Workpiece

The invention claimed is:

1. A device for monitoring a state of a ball screw, the ball screw having a screw shaft, a nut, and a plurality of balls, the device comprising:

a period acquisition unit, implemented by a processor, configured to acquire a data collection period in which the nut is caused to move relative to the screw shaft at a constant speed in one direction under an unloaded condition within an operation cycle of the ball screw driven by a servo motor;

a data collection unit, implemented by the processor, that collects, as data, a physical quantity related to the ball screw in the data collection period acquired by the period acquisition unit, the physical quantity relating to at least one of vibration of the ball screw or nut, torque of the servo motor, and electric current of the servo motor; and a signal acquisition unit, implemented by the processor, that receives a trigger signal from an equipment while the equipment is not in operation, the equipment having the ball screw and configured to perform machining, wherein the nut is caused to move after the signal acquisition unit receives the trigger signal from the equipment, and wherein a moving area of the nut during the data collection period includes an area in which the nut was caused to move while the equipment was performing the machining.

2. The device for monitoring a state of a ball screw according to claim 1, wherein the period acquisition unit, implemented by the processor, acquires a period in which the ball screw returns to a start position of the ball screw.

3. The device for monitoring a state of a ball screw according to claim 1, wherein the period acquisition unit, implemented by the processor, acquires a grease supply cycle of the ball screw.

4. The device for monitoring a state of a ball screw according to claim 1, wherein the period acquisition unit, implemented by the processor, periodically acquires the data collection period under a same condition.

5. The device for monitoring a state of a ball screw according to claim 1 further comprising an analysis unit, implemented by the processor, that analyzes data collected by the data collection unit and monitors the state of the ball screw.

6. The device for monitoring a state of a ball screw according to claim 5, wherein the analysis unit includes an abnormal portion specifying unit, implemented by the processor, that divides the data collected by the data collection unit into a plurality of data, and specifies a location of occurrence of abnormality in the ball screw based on an analysis result of the plurality of data.

7. The device for monitoring a state of a ball screw according to claim 1, wherein the physical quantity is an axial vibration of the nut.

8. The device for monitoring a state of a ball screw according to claim 7 further comprising a vibration sensor configured to detect vibration and provide vibration data, and wherein the vibration sensor is fixed to the nut or to a movable member that is operatively coupled to the nut and is movable relative to the screw shaft together with the nut.

9. A method for monitoring a state of a ball screw, the ball screw having a screw shaft, a nut, and a plurality of balls, the method comprising the steps of:

controlling a drive unit, including a servo motor, that causes the nut to move relative to the screw shaft at a constant speed under an unloaded condition for at least one reciprocating motion; and collecting, as data, a physical quantity related to the ball screw while the drive unit is being controlled, the physical quantity relating to at least one of vibration of the ball screw or nut, torque of the servo motor, and electric current of the servo motor; and receiving a trigger signal from an equipment while the equipment is not in operation, the equipment having the ball screw and configured to perform machining, wherein the nut is caused to move after the trigger signal is received from the equipment, and wherein a moving area of the nut during the collection of data includes an area in which the nut was caused to move while the equipment was performing the machining.

10. A method for monitoring a state of a ball screw, the ball screw having a screw shaft, a nut, and a plurality of balls, the method comprising the steps of:

acquiring a data collection period in which the nut is caused to move relative to the screw shaft at a constant speed in one direction under an unloaded condition within an operation cycle of the ball screw driven by a servo motor;

collecting data of a physical quantity related to the ball screw in the data collection period, the physical quantity relating to at least one of vibration of the ball screw or nut, torque of the servo motor, and electric current of the servo motor; and receiving a trigger signal from an equipment while the equipment is not in operation, the equipment having the ball screw and configured to perform machining, wherein the nut is caused to move after the trigger signal is received from the equipment, and wherein a moving area of the nut during the collection of data includes an area in which the nut was caused to move while the equipment was performing the machining.

* * * * *